N. PETERSON.
TROLLEY RETRIEVER.
APPLICATION FILED JULY 29, 1909.
977,398.
Patented Nov. 29, 1910.
3 SHEETS—SHEET 1.
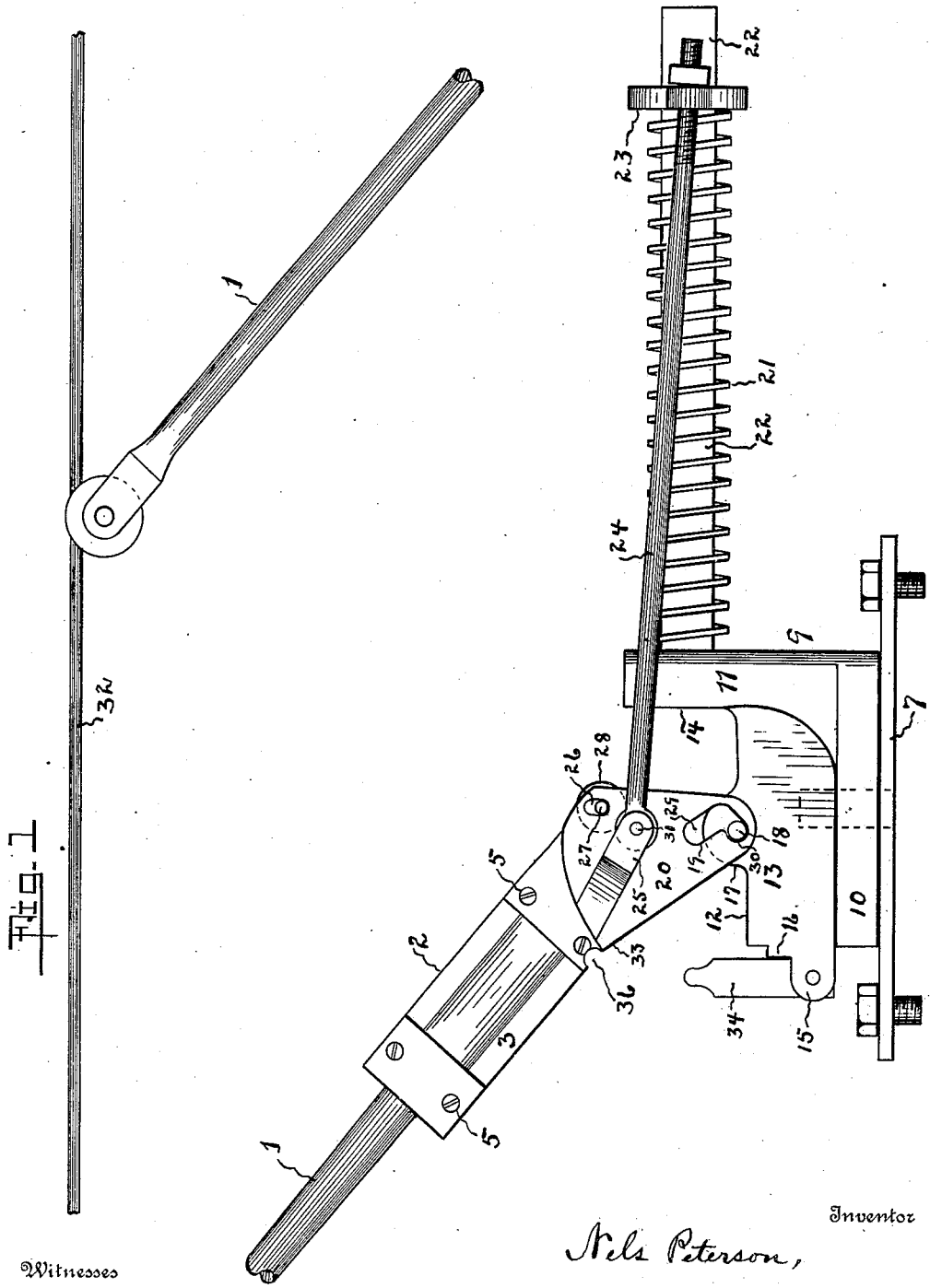
Witnesses
Arthur Sturges.
L. D. Brown.
Inventor
Nels Peterson,
By Hiram A. Sturges,
Attorney

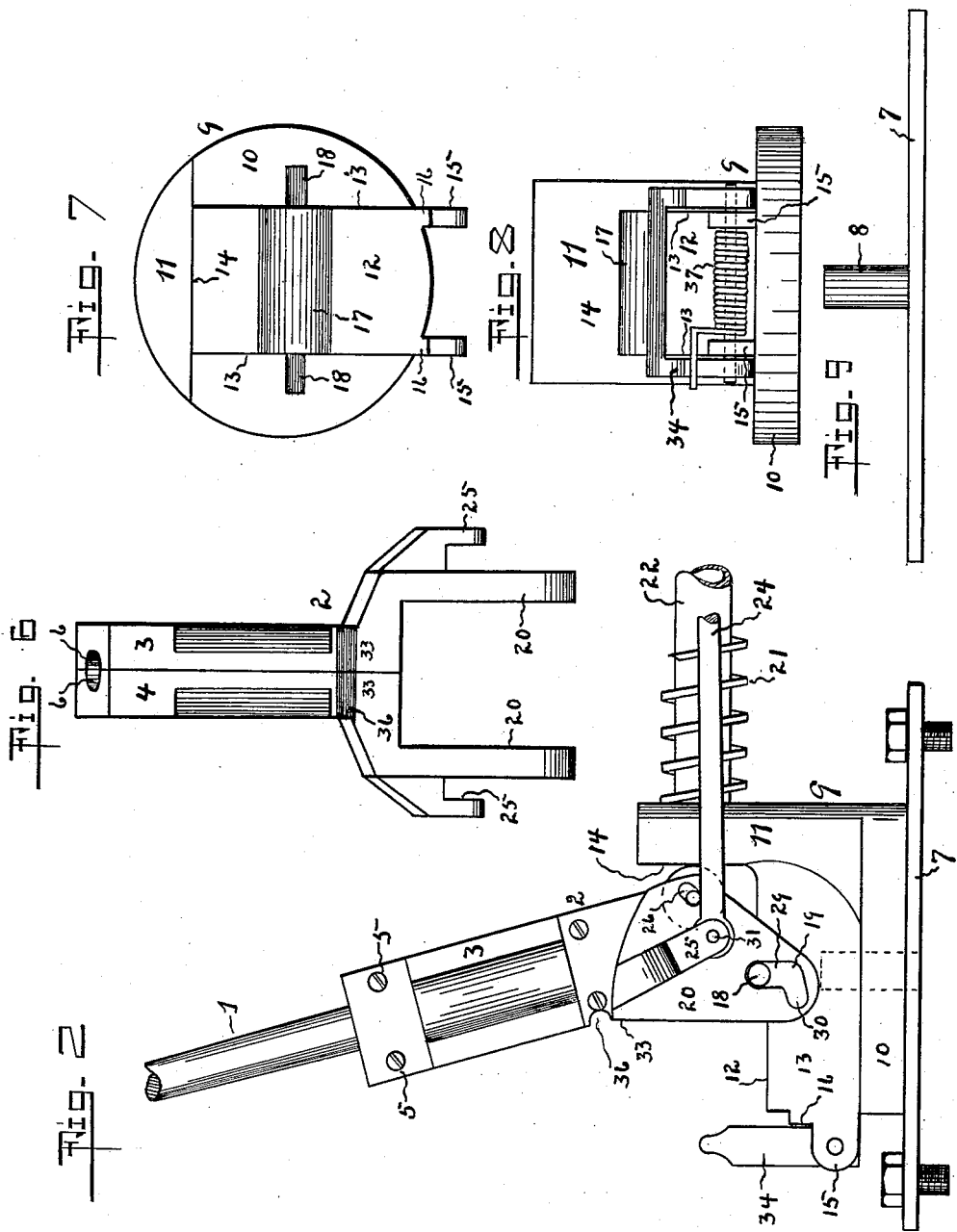

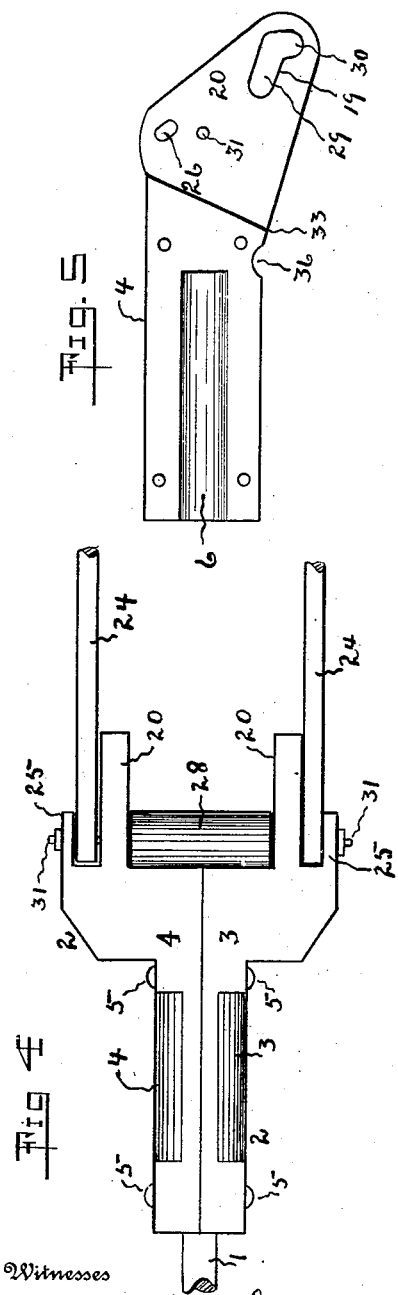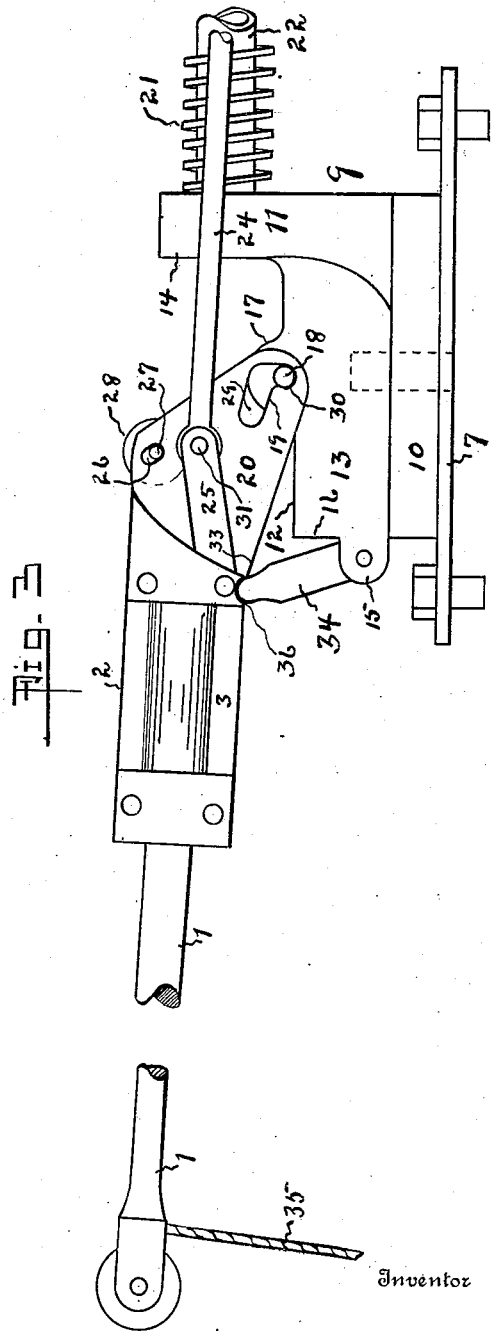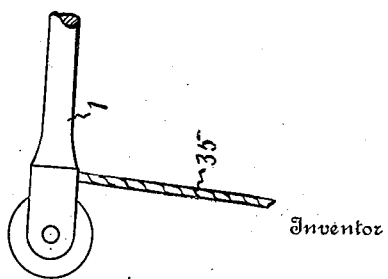

UNITED STATES PATENT OFFICE.

NELS PETERSON, OF OMAHA, NEBRASKA, ASSIGNOR TO MURPHY DID IT COMPANY, OF OMAHA, NEBRASKA, A CORPORATION OF NEBRASKA.

TROLLEY-RETRIEVER.

977,398.  Specification of Letters Patent.  Patented Nov. 29, 1910.

Application filed July 29, 1909. Serial No. 510,162.

*To all whom it may concern:*

Be it known that I, NELS PETERSON, a citizen of the United States, residing at Omaha, in the county of Douglas and State of Nebraska, have invented certain new and useful Improvements in Trolley - Retrievers, of which the following is a specification.

This invention relates to means for controlling trolley poles of electric cars. In cars of this class where overhead wires are used, the trolley often becomes disengaged from the wire and thrown violently forward by force of the spring in a manner to cause occasional breakage or injury of parts. Whenever the trolley becomes disengaged, retrieving or moving the pole back to its normal position by the operator, causes considerable delay and inconvenience.

The principal object of the invention is to provide means for retrieving the trolley which will be reliable in operation and convenient in use, said means to consist of few and simple parts so that construction will be economical.

The invention also has reference to the employment of parts so constructed and operative that they will occupy as limited a space as possible, and which may be conveniently installed for use upon ordinary cars, and includes certain features of construction relating to durability, also relating to convenience in assembling the parts.

With these objects in view the invention presents a novel combination and arrangement of parts as described herein, pointed out by the appended claims, and as illustrated in the accompanying drawing, it being understood that changes in form, size, proportion and minor details may be made within the scope of the claims without departing from the spirit or sacrificing any of the advantages of the invention.

In the drawing Figure 1 is a vertical, side view of a trolley retriever embodying my invention, the pole being shown broken away; the yoke being in a normal position. Fig. 2 is a somewhat similar view to that shown in Fig. 1, the trolley pole being thrown forwardly, as when accidentally disengaged from the overhead wire. Fig. 3 is a view showing similar parts, the trolley pole being in a lowered position. Fig. 4 is a plan view of the trolley yoke. Fig. 5 is a view of the inner side of one of the side-members of the trolley yoke. Fig. 6 is a perspective, front view of the trolley yoke. Fig. 7 is a plan view of the rotatable base-member, for the support of the yoke. Fig. 8 is a vertical front view of the resiliently mounted fulcrum-bar and parts connected therewith. Fig. 9 is a view of the supporting plate or base.

Referring now to the drawing for a more particular description, numeral 1 indicates a trolley pole, and 2 the trolley yoke consisting of side-members 3 and 4 held together by any suitable means, as by screw-bolts 5, each of said members being provided with a longitudinal recess 6 for seating therein of the lower end of the pole.

At 7 is indicated a platform or support used generally upon cars of this class. It is usually secured rigidly upon the top of the car and provided with the pivot-post or stud 8.

I provide a horizontally rotatable base member 9 which may be mounted upon stud 8; it is preferably formed as a circular plate 10 with an upright projection or standard 11 near its edge, and with a block 12 seated upon and having a less width than the plate, and having vertical, parallel sides 13, these sides extending longitudinally from the standard to the opposite edge of the block and at right angles to the standard. The standard is formed, upon its inner side, with a vertical surface or flat wall 14 for uses presently described, and upon that part of block 12 opposite standard 11 are provided brackets 15, having stop-lugs 16. The parts constituting the base member may be and preferably are constructed as an integral casting, and the middle of block 12 is reinforced or formed as an elevated part, indicated at 17, to provide a suitable mounting for horizontal shaft or trunnions 18 upon which the trolley yoke may be mounted. Base member 9 may be cast by use of inexpensive metal; shaft or trunnions 18, however, should be constructed of strong metal since severe stresses must be sustained. A suitable opening is provided transversely in the block and the shaft is usually driven to a firm seating therein, so that it may not be readily removed, after which the two yoke members are mounted thereon, and secured together by bolts 5 at the time the trolley pole is inserted.

I provide the slots 19 near the terminals of arms 20 of the trolley yoke for seating therein of the projecting ends of shaft 18. Arms 20 of the yoke are preferably formed as parallel plates and sides 13 of the block provide contact surfaces or bearings upon which the inner, flat surfaces of arms 20 are seated, and the trolley yoke and pole, as is apparent, may have forward and rearward swinging movements upon this pivotal mounting, subject to the resiliency of spring 21, this coiled spring being seated upon arm 22. Arm 22 extends forwardly from standard 11 and is so disposed with reference to the yoke that said yoke, during its movements, swings in a vertical plane passing through said arm. The inner end of arm 22 is secured upon the standard, and the spring has bearings upon the standard and cross head 23, the latter being mounted slidably upon the arm; rods or links 24 have their outer ends adjustably mounted upon the cross head so that the tension of the spring may be regulated, and the inner ends of rods 24 are pivotally mounted upon brackets 25 of the yoke arms. The edges of each of arms or plates 20 of the trolley yoke are preferably formed convergent in the direction of their respective terminals, and said arms or plates while disposed parallel with reference to each other, extend at an angle or pitch with reference to the longitudinal recesses 6. Near the upper end of these arms and adjacent standard 11 are formed slots 26, brackets 25 being intermediate said slots 26 and slots 19. Slots 26 provide a pivotal mounting for shaft 27 of roller 28, and said roller, upon occasion, may bear upon upright wall 14 of the standard. Slots 19 are uniform in structure. They are formed as longitudinal apertures 29 extending in a direction from near the terminals of yoke arms 20 toward the body of the yoke, the outer extremity of apertures 29 having transversely formed recesses 30 opening thereon, said recesses being formed in the longitudinal wall of aperture 29 opposite pivot 31 of brackets 25, and thereby forming angular slots 19.

In operation, when the trolley pole is supported upon overhead-wire 32, shaft 18 is seated in recesses 30, as shown in Fig. 1, and when the trolley becomes disengaged from the overhead wire, the trolley pole will be thrown upward to the position shown in Fig. 2. During this movement roller 28 makes contact with vertical wall 14 of the standard, and the yoke will move downward until shaft 18 is seated in the upper ends of apertures 29. The tension of the spring while the yoke is in this last named position is very much reduced on account of the forward movement of the cross-head upon arm 22, and the degree of tension is such that the yoke will swing downwardly by its own weight until contact-surface 33, upon the lower part of the yoke, is engaged by the upper end of the resiliently and pivotally mounted fulcrum-bar 34. The operator then, by use of the ordinary pull-rope 35 secured upon the outer terminal of the trolley pole, may cause said pole to swing farther downward, and the yoke will thereupon move longitudinally in a direction away from the spring, a limited distance, until shaft 18 again engages recesses 30. Fulcrum-bar 34, best shown in Fig. 8, is pivotally mounted upon and near the ends of brackets 15, and is normally disposed in an upright position, in contact with stop-lugs 16, by operation of spring 37. It extends above block 12 when in this upright position, and has a length sufficient to provide a bearing for arms 20 of the yoke when said yoke is lowered. At the time the operator commences to pull downward, the fulcrum bar is in a vertical position, surface 33 of the yoke resting upon the rounded part of said bar, and the bar may slide a limited distance upon surface 33 until it engages the transversely formed groove 36 of the yoke; a continued downward pull by the operator, after the fulcrum is in engagement with groove 36 causes the longitudinal movement of the yoke referred to, the weight of the trolley yoke being sustained at this time by the fulcrum-bar, at which time the fulcrum is partly rotated, and the tension of spring 21 is increased for the reason that the yoke is moved rearwardly. The original tension of the spring having been attained by this operation, the operator allows the trolley pole to swing upward, being careful to seat the trolley wheel upon the overhead wire.

The force required by an operator for causing the adjustment just described, is very slight. The operator causes a movement of the yoke, while compressing the spring, a distance equal to the length of apertures 29, the fulcrum-bar having a smooth, rotating movement at this time. The function of spring 37 is to cause the fulcrum-bar to remain in an upright position in engagement with stop-lugs 16 at all times when not in use, so that, upon occasion, it may operatively engage groove 36, as described.

While ordinary pivot-openings would probably be operative for the mounting of shaft 27 of roller 28, I prefer to employ slots, since the shaft of the roller may slide therein, the operation being that the yoke passes downward without undue vibration after the trolley pole has been disengaged from the overhead wire, shaft 27 sliding in slots 26 as well as rolling upon wall 14 of the standard. It is understood, of course, that when trunnions 18 are seated in the upper terminals of slots 19, as shown in Fig. 2, the radial distance therefrom to pivot 31 is considerable less than when seated in recesses 30, illustrated in Fig. 1, and, on account of this fact, the tension of the spring is readily overcome by the combined weight of the trolley pole and yoke.

In the description, the terms "trunnions" and "shaft" have been used interchangeably when describing member 18. It has been explained, however, that this member may be constructed non-removably from block 12, and, in such case, it is believed the term "trunnions" may be used; and when the block is provided with trunnions, yoke 2 should consist of side members 3 and 4 as shown, and this is the preferred construction.

Having fully described my invention, what I claim and desire to secure by Letters Patent is,—

1. A trolley retriever, comprising, in combination with a support provided with trunnions, and a resilient member mounted upon the support; a trolley yoke having arms connected with the resilient member and provided with angular slots, the trolley yoke adapted to have a seating upon said support, the trunnions thereof engaging within the angular slots of said arms.

2. A trolley retriever, comprising, in combination with an upright, rotatable support provided with a horizontal shaft; a resilient member mounted upon the support; a trolley yoke having a pair of arms connected with the resilient member, each of said arms being provided with an angular slot, said trolley yoke adapted to have a seating upon said support, the shaft of said support engaging the angular slot of each of said arms.

3. A trolley retriever, comprising a rotatable support provided with trunnions; longitudinally slidable, resiliently mounted links; a trolley yoke having a pair of arms connected with said links, each of said arms having elongated apertures formed therein, said trolley yoke adapted to have a seating upon said support, the trunnions of the support engaging within the elongated apertures of said arms.

4. In combination, a trolley retriever, comprising a horizontally rotatable, supporting-block with trunnions, and provided with a standard having an outwardly extending supporting-arm; a trolley yoke having vertically movable arms with elongated apertures formed longitudinally therein traversed by said trunnions; a striding piece seated upon the supporting-arm; a spring upon said supporting-arm intermediate the striding piece and said standard; a pair of links mounted longitudinally adjustable upon said striding piece and having pivotal mountings upon said yoke; the downward movement of said yoke arms causing an engagement of said trunnions upon the inner terminals of said elongated apertures; the upward movement of the yoke arms disposing said trunnions in the outer terminals of said elongated apertures.

5. In combination, a trolley retriever, comprising a horizontally rotatable supporting-block with trunnions, and provided with a standard having an outwardly extending supporting-arm and an inner, upright wall; a trolley yoke; a roller mounted upon the arms of said yoke, said yoke arms having elongated apertures extending longitudinally thereof and traversed by said trunnions; resiliently mounted links upon said supporting-arm and pivotally connected with the trolley yoke; said yoke adapted to have a pivotal movement in the direction of said standard in alinement with said supporting-arm, the roller contacting with the inner, upright wall of said standard, the trunnions of said block then engaging the lower terminals of said apertures; said yoke adapted to have a swinging movement in a direction opposed to said standard in a vertical plane passing through the supporting-arm, the trunnions of the block then engaging the upper terminals of said elongated apertures.

6. A trolley retriever, in combination, comprising a horizontally rotatable supporting block with trunnions thereon and provided with a standard; a fulcrum-bar pivotally mounted upon said block; a trolley yoke having its arms formed with longitudinal apertures, said apertures having recesses opening thereon at their lower terminals; resilient means normally detaining the yoke arms adjacent to said standard; said yoke arms adapted to have a swinging movement in the direction of said standard, the trunnions being engaged within said recesses; said yoke arms adapted to have a swinging movement in a direction opposed to said standard, said trunnions then engaging within the upper terminals of the longitudinal apertures of said arms, said yoke making engagement with said fulcrum-bar.

7. A trolley retriever, in combination, comprising a supporting member with trunnions thereon and provided with a standard; a pivotally mounted fulcrum-bar; a trolley yoke provided with a transverse engaging-groove, and having its arms formed with longitudinal apertures, said apertures having recesses opening thereon at their lower terminals; resilient means normally detaining the yoke arms adjacent to said standard; said yoke arms adapted to have a swinging movement in the direction of said standard, the trunnions being engaged within said recesses; said yoke adapted to have a swinging movement in a direction opposed to said standard, said trunnions then engaging within the upper terminals of the longitudinal apertures of said arms, said fulcrumbar making engagement with the transverse groove of said yoke.

8. A trolley retriever as described, comprising, in combination with a supporting-member provided with trunnions, and provided with a standard having a side wall; a trolley yoke provided with a transverse engaging-groove; a roller mounted upon the arms of said yoke; said arms having elongated apertures extending longitudinally thereof, said apertures having recesses opening thereon at their lower terminals; resilient means normally detaining the yoke arms adjacent to said standard; said yoke arms adapted to have a swinging movement in a direction of the standard, said roller contacting with the side wall thereof, the trunnions being engaged within said recesses; said yoke arms adapted to have a swinging movement in a direction opposed to said standard, said trunnions then engaging within the upper terminals of the longitudinal apertures of said arms, said fulcrumbar making engagement with the transverse engaging-groove of said yoke.

9. In a trolley retriever, the combination with a rotatable support provided with trunnions and an upright, of a trolley yoke comprising a pair of side members each formed with an arm having an elongated slot formed longitudinally thereof; means for securing said trolley arms adjacently-disposed, said trunnions traversing said slots; resilient means for detaining said yoke normally adjacent said upright; said yoke adapted to have movements to dispose the terminals of said elongated slot in contact, alternately, with said trunnions.

In testimony whereof I have affixed my signature in presence of two witnesses.

NELS PETERSON.

Witnesses:
  HIRAM A. STURGES,
  ARTHUR STURGES.